US010753425B2

(12) United States Patent
Ramsey et al.

(10) Patent No.: US 10,753,425 B2
(45) Date of Patent: Aug. 25, 2020

(54) INTERNAL ROTOR DAMPER MODULAR HYBRID TRANSMISSION

(71) Applicant: Schaeffler Technologies AG & Co. KG, Herzogenaurach (DE)

(72) Inventors: John Ramsey, Mansfield, OH (US); Matthew Payne, Glenmont, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 121 days.

(21) Appl. No.: 15/801,910

(22) Filed: Nov. 2, 2017

(65) Prior Publication Data
US 2019/0128367 A1 May 2, 2019

(51) Int. Cl.
*F16D 13/54* (2006.01)
*F16F 15/123* (2006.01)

(52) U.S. Cl.
CPC .......... *F16F 15/1232* (2013.01); *F16D 13/54* (2013.01); *F16F 15/12373* (2013.01); *B60Y 2200/92* (2013.01); *B60Y 2400/48* (2013.01); *F16D 2300/22* (2013.01); *Y10S 903/903* (2013.01)

(58) Field of Classification Search
CPC .. F16F 15/1216; F16F 15/1232; F16F 15/123; F16D 13/54; F16D 25/0638; F16D 2300/22; B60Y 2400/48; B60Y 2400/60
See application file for complete search history.

(56) References Cited

U.S. PATENT DOCUMENTS

| 6,354,974 | B1* | 3/2002 | Kozarekar | B60K 6/26 180/65.21 |
| 9,085,295 | B2 | 7/2015 | Kamiyama | |
| 2006/0225984 | A1* | 10/2006 | Tanishima | B60K 6/387 192/48.8 |
| 2006/0289209 | A1* | 12/2006 | Grosspietsch | B60K 6/26 180/65.25 |
| 2007/0267270 | A1 | 11/2007 | Sudau et al. | |
| 2009/0283344 | A1* | 11/2009 | Arnold | B60K 6/26 180/65.22 |
| 2011/0100736 | A1 | 5/2011 | Borntrager et al. | |

(Continued)

FOREIGN PATENT DOCUMENTS

JP 2013 248913 A 12/2013

OTHER PUBLICATIONS

"Definition of engage" retrieved from www.merriam-webster.com on Aug. 9, 2019 (Year: 2019).*

(Continued)

*Primary Examiner* — Stacey A Fluhart
(74) *Attorney, Agent, or Firm* — Davidson, Davidson & Kappel, LLC

(57) ABSTRACT

A hybrid module is configured for arrangement in a torque path upstream from a transmission and downstream from an internal combustion engine. The hybrid module includes an electric motor and a clutch. The electric motor includes a rotor and a rotor carrier supporting the rotor. The hybrid module also includes a damper assembly fixed to the rotor carrier. The clutch is configured for selectively coupling the damper assembly to a shaft drivingly coupled to the internal combustion engine. The damper assembly includes an output configured for connecting to an input shaft of the transmission.

20 Claims, 2 Drawing Sheets

(56) References Cited

U.S. PATENT DOCUMENTS

| | | | |
|---|---|---|---|
| 2012/0318630 A1 | 12/2012 | Iwase et al. | |
| 2013/0113308 A1 | 5/2013 | Dogel | |
| 2013/0288808 A1* | 10/2013 | Maeda | F16H 45/02 |
| | | | 464/68.1 |
| 2014/0034443 A1* | 2/2014 | Reitz | B60K 6/26 |
| | | | 192/30 V |
| 2014/0326570 A1* | 11/2014 | Isobe | F16D 13/56 |
| | | | 192/70.11 |
| 2015/0231957 A1* | 8/2015 | Lebeau | H02K 3/28 |
| | | | 192/55.2 |
| 2016/0245373 A1* | 8/2016 | Kasuya | B60K 6/26 |
| 2016/0263984 A1* | 9/2016 | Kasuya | B60K 6/26 |
| 2017/0050506 A1* | 2/2017 | Trinkenschuh | F16D 25/0638 |

OTHER PUBLICATIONS

International Search Report and Written Opinion for corresponding PCT/US2018/056733, dated Feb. 13, 2019.

\* cited by examiner

INTERNAL ROTOR DAMPER MODULAR HYBRID TRANSMISSION

The present disclosure relates generally to hybrid motor vehicle drive trains and more specifically to rotor dampers used therein.

BACKGROUND

Some hybrid motor vehicle drive trains include a hybrid module including a torque converter.

SUMMARY OF THE INVENTION

A hybrid module is configured for arrangement in a torque path upstream from a transmission and downstream from an internal combustion engine. The hybrid module includes an electric motor and a clutch. The electric motor includes a rotor and a rotor carrier supporting the rotor. The hybrid module also includes a damper assembly fixed to the rotor carrier. The clutch is configured for selectively coupling the damper assembly to a shaft drivingly coupled to the internal combustion engine. The damper assembly includes an output configured for connecting to an input shaft of the transmission.

Embodiments of the hybrid module may include one or more of the following features:

the damper assembly includes a front damper hub configured for centering the shaft drivingly coupled to the internal combustion engine;

the damper assembly includes a plurality of springs, the springs being radially inside of the rotor carrier;

the damper assembly includes a rear damper hub including a pump hub configured for driving an oil pump;

the rear damper hub is configured for centering a front support of the transmission;

the rotor carrier includes an axially extending section and a radially extending section, the damper assembly being fixed to the radially extending section of the rotor carrier;

the damper assembly includes a rear damper cover and a front damper cover, the rear damper cover and the front damper cover being fixed to the radially extending section of the rotor carrier;

the rear damper cover and the front damper cover are fixed to the radially extending section of the rotor carrier by fasteners that pass through a radially outer end of the rear damper cover and a radially outer end of the front damper cover and into the radially extending section of the rotor carrier;

the damper assembly includes at least one spring retainer retaining a plurality of springs, the rear damper cover and the front damper cover surrounding the springs;

the damper assembly includes a damper flange fixed to the damper output configured for being driven by the springs of the at least one spring retainer;

the at least one spring retainer includes a first spring retainer retaining a first set of the springs and a second spring retainer retaining a second set of the springs, both of the first and second sets of springs configured for driving the damper flange.

A method of constructing a hybrid module configured for arrangement in a torque path upstream from a transmission and downstream from an internal combustion engine is also provided. The method includes providing an electric motor and a clutch. The electric motor includes a rotor and a rotor carrier supporting the rotor. The method also includes fixing a damper assembly to the rotor carrier such that the clutch is configured for selectively coupling the damper assembly to a shaft drivingly coupled to the internal combustion engine. The damper assembly includes an output configured for connecting to an input shaft of the transmission.

Embodiments of the method may include one or more of the following features:

providing the damper assembly with a front damper hub configured for centering the shaft drivingly coupled to the internal combustion engine and a rear damper hub including a pump hub configured for driving an oil pump;

the rear damper hub is configured for centering a front support of the transmission;

providing the damper assembly with a plurality of springs radially inside of the rotor carrier;

the rotor carrier includes an axially extending section and a radially extending section, the damper assembly including a rear damper cover and a front damper cover, the fixing of the damper assembly to the rotor carrier including fixing the rear damper cover and the front damper cover to the radially extending section of the rotor carrier;

the damper assembly includes at least one spring retainer retaining a plurality of springs, the damper assembly including a damper flange fixed to the damper output configured for being driven by the springs of the at least one spring retainer;

at least one spring retainer includes a first spring retainer retaining a first set of the springs and a second spring retainer retaining a second set of the springs, both of the first and second sets of springs configured for driving the damper flange.

BRIEF DESCRIPTION OF THE DRAWINGS

The present invention is described below by reference to the following drawings, in which.

DETAILED DESCRIPTION

The present disclosure provides a hybrid module that does not include a torque converter. Removing the TC from the front module led to some problems with damper integration and centering of the connect/disconnect clutch. The module still required damping and the connect/disconnect clutch had to be increased in length in order to function as a disconnect and launch clutch. In order to package a damper in the most optimized way, the present disclosure provided a damper designed to be integrated into the inner diameter of the rotor carrier hub. In order to maintain the functionality of the pump hub, the present disclosure also incorporates a pump hub, so that the oil pump can still be driven. This damper hub assembly now provides centering functionality for the shaft which is longer than previous modular hybrid transmission designs. The centering of the shaft can be performed by a bearing or bushing. These features combined solve the problem of removing the launch device—i.e., fluid coupling device, which in this case would be a torque converter, from the front module.

Figure 1:
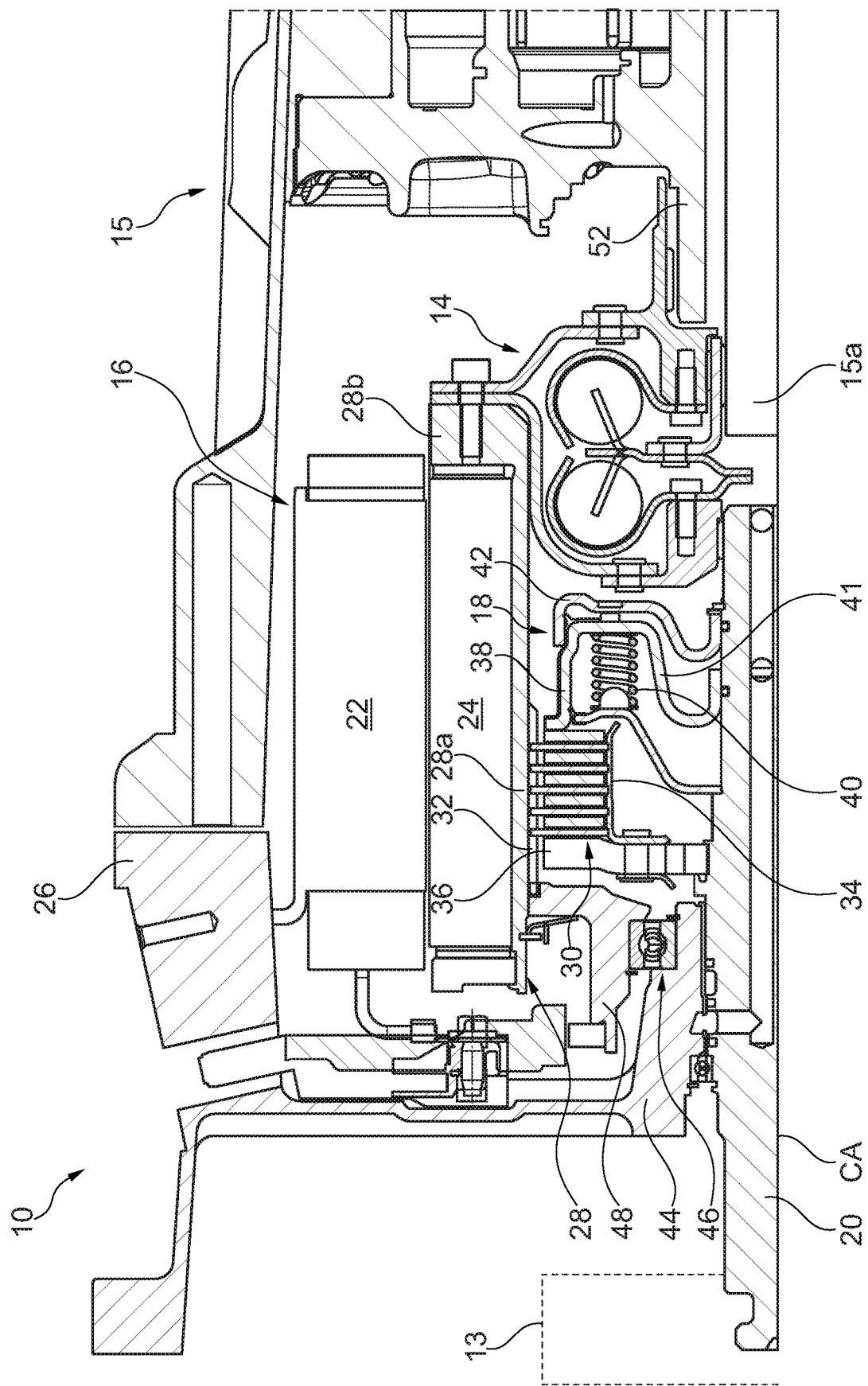
FIG. 1 shows a hybrid module in accordance with an embodiment of the present invention.

FIG. 1 shows hybrid module 10 in accordance with an embodiment of the present invention. Module 10 is configured for attachment to an internal combustion engine 13 and includes a damper assembly 14 configured for attachment to a transmission input shaft 15a of a transmission 15. Hybrid module 10 is selectively operable to transmit torque from the internal combustion engine 13 to damper assembly 14 or directly drive damper assembly 14 via an electric motor 16 of hybrid module 10, or combine motor 16 and combustion engine 13 to drive damper assembly 14. Along these lines, hybrid module 10 includes an engine connect/disconnect clutch 18 for selectively connecting damper assembly 14 to a shaft 20, which is configured for non-rotatably connecting to a crankshaft of the internal combustion engine, or disconnecting damper assembly 14 from shaft 20 such that torque converter can be driven solely by electric motor 16.

Electric motor 16 includes a stator 22 and a rotor 24, with stator 22 being fixed to a housing 26 of hybrid module 10. Upon current being provided to coils of stator 22, rotor 24 is rotated about a center axis CA of hybrid module 10 in a known manner, due to rotor 24 including a plurality of permanent magnet segments of rotor 24 that are energized by the current in the coils. The terms axially, radially and circumferentially as used herein are used with respect to center axis CA. Rotor 24 is supported at its inner circumference by a rotor carrier 28. Rotor carrier 28 includes a cylindrical axially extending section 28a supporting the inner circumference of rotor 24 and a radially extending section 28b protruding radially outward from an end of axially extending section 28a to axially align magnet 24 on section 28a.

Clutch 18 includes a plurality of clutch plates 30, at least some of which are supported in an axially slidable manner at outer diameter ends thereof by splines 32 formed on an inner circumferential surface of axially extending section 28a. At least one of clutch plates 30 are supported in an axially slidable manner at inner diameter ends thereof by an inner support 34 that is fixed to a counter pressure plate 36, which is nonrotatably fixed to shaft 20. Clutch 18 further includes a piston 38 that is axially slidable along an outer circumference of shaft 20 to engage and disengage clutch 18 based on fluid pressure differences on front and rear sides of piston 38. When piston 38 forces clutch plates 30 against counter pressure plate 36, clutch 18 is engaged and torque from shaft 20 is transmitted through clutch plates 30 into rotor carrier 28, which then transmits the received torque to damper assembly 14. Piston 38 is held axially away from clutch plates 30 by a spring 40 supported by a support plate 41. Piston 38 is also resiliently connected to a liftoff control plate 42 that limits the liftoff of piston 38 with respect to clutch plates 30.

Housing 26 includes an axially extending protrusion 44 provided on an engine side of clutch 18 radially outside of shaft 20. Protrusion 44 supports a ball bearing 46, which rotatably supports a rotor flange 48 on protrusion 44. An inner race of ball bearing 46 sits on an outer circumferential surface of protrusion 44 and rotor flange 48 extends from an outer circumferential surface of the outer race of ball bearing 46 to axially extending section 28a of rotor carrier 28.

Figure 2:
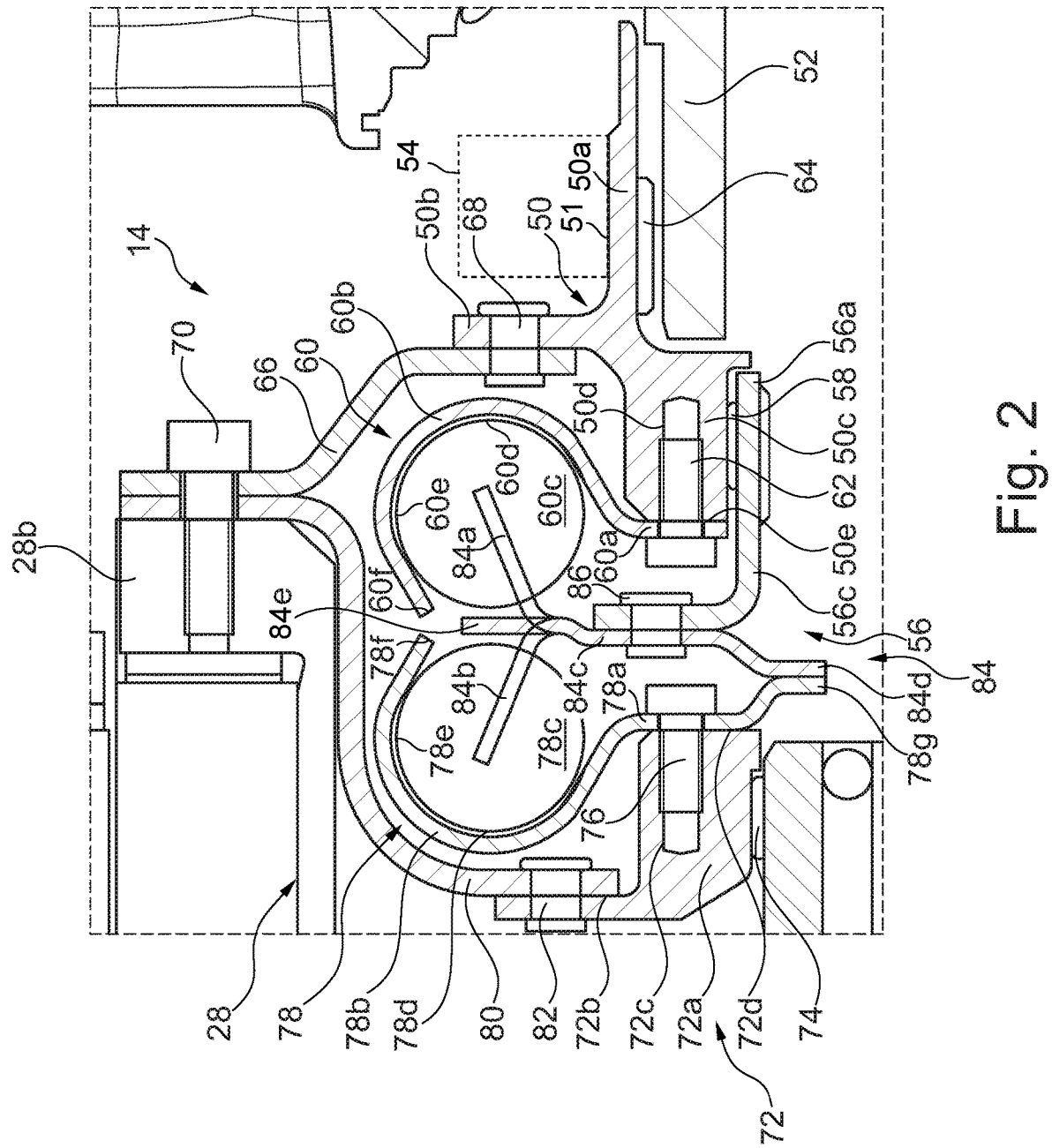
FIG. 2 shows an enlarged view of a damper assembly of the hybrid module shown in FIG. 1.

FIG. 2 shows an enlarged view of damper assembly 14, which is provided on a transmission side of clutch 18. Damper assembly including a rear damper hub 50 configured for centering drive module 10 on a front support 52 of transmission 15. Rear damper hub 50 also centers a damper spline 56a of a damper output 56 of damper assembly 14 via a bushing 58 and attaches a first or rear spring retainer 60 via fasteners 62, which in this embodiment are bolts. More specifically, rear damper hub 50 includes an axially extending portion 50a extending around an outer circumferential surface of front support 52, with axially extending portion 50a being rotatably received on front support 52 due to a bushing 64 provided radially between an inner circumferential surface of portion 50a and the outer circumferential surface of front support 52. An outer diameter surface of axially extending portion 50a is formed as a pump hub 51 configured for driving an oil pump 54, which is schematically shown in FIG. 2. For example, axially extending portion 50a may be substantially cylindrical with a plurality of circumferentially spaced flats provided on the outer diameter surface thereof to form pump hub 51. The flats are configured for non-rotatably engaging with corresponding flats of an oil pump input such that pump hub 51 is configured for driving oil pump 54. Alternatively, pump hub 51 may be formed by splines or teeth configured for non-rotatably mating with a corresponding surface of oil pump 54.

Rear damper hub 50 further includes a radially extending portion 50b protruding radially outward from axially extending portion 50a, which is on a rear side of portion 50b, and from an axial protrusion 50c, which is on a front side of portion 50b. Radially extending portion 50b is fixed to a rear damper cover 66, which is a torque input section for rear damper hub 50, by a plurality of circumferentially spaced fasteners 68, which in this embodiment are rivets that pass through both rear torque input section 66 and radially extending portion 50b. Axial protrusion 50c receives bushing 58 on an inner circumferential surface thereof for centering damper spline 56a. Axial protrusion 50c also includes a plurality of circumferentially spaced axially extending blind holes 50d formed therein at a front radially extending surface 50e thereof for receiving fasteners 62, which in this embodiment are bolts that connect first spring retainer 60 to rear damper hub 50. Rear damper hub 50 is fixed to rotor carrier 28 by rear damper cover 66 such that damper hub 50 receives torque from the internal combustion engine and electric motor 16 as dictated by clutch 18. Fasteners 70, which in this embodiment are bolts, pass axially through a radially outer end of rear damper cover 66 into radially extending section 28b.

Damper assembly further includes a front damper hub 72 configured for centering damper assembly 14 on a rear end of shaft 20. Front damper hub 72 includes a rear axially extending protrusion 72a protruding axially forward from a radially extending section 72b. Protrusion 72a has an inner circumferential surface that is supported on the outer circumferential surface of shaft 20 via a bushing 74. Axially extending protrusion 72a also includes a plurality of circumferentially spaced axially extending blind holes 72c formed therein at a rear radially extending surface 72d thereof for receiving fasteners 76, which in this embodiment are bolts that connect a second or front spring retainer 78 to front damper hub 72. Radially extending portion 72b protrudes radially outward from axial protrusion 72a and is fixed to a front damper cover 80, which is a torque input section for front damper hub 72, by a plurality of circumferentially spaced fasteners 82, which in this embodiment are rivets. Front damper cover 80 extends radially outward from portion 72b and then curves to extend axially along an entirety of the outer circumference of spring retainer 78 and a portion of the outer circumference of spring retainer 60, before curving radially outward along radially extending section 28b of rotor carrier 28. A radially outer end of front damper cover 80 is sandwiched between rear damper cover 66 and the radially outer end of extending section 28b of rotor carrier 28. and radially extending section 28b of rotor carrier 28. Bolts 70 pass through the radially outer end of rear damper cover 66, through the radially outer end of front damper cover 80 and into radially extending section 28b of rotor carrier 28.

First spring retainer 60 includes a radially inner portion 60a through which bolts 62 pass and a rounded outer portion 60b that supports a plurality of circumferentially spaced first arc springs 60c. Rounded outer portion 60b begins radially inside of springs 60c, then while extending radially outward, curves axially rearward along rearmost edges 60d of springs 60c and back axially frontward along outermost circumferences 60e of springs 60c. Then rounded portion 60b extends back radially inward while extending further frontward, with an outer rim 60f of spring retainer 60 facing second spring retainer 78.

Second spring retainer 78 includes a radially inner portion 78a through which bolts 76 pass and a rounded outer portion 78b that supports a plurality of circumferentially spaced first arc springs 78c. Rounded outer portion 78b begins radially inside of springs 78c, then while extending radially outward, curves axially frontward along frontmost edges 78d of springs 78c and back axially rearward along outermost circumferences 78e of springs 78c. Then rounded portion 78b extends back radially inward while extending further frontward, with an outer rim 78f of spring retainer 78 facing first spring retainer 60. More specifically, outer rims 60f, 78f axially face each other. Rear cover 66 and front cover 80 together surround springs 60c, 78c.

A damper flange 84 is provided axially between spring retainers 60, 78 for activating arc springs 60c, 78c. Damper flange 84 includes first or rear damper tabs 84a configured for contacting circumferential ends of springs 60c and second or front damper tabs 84b configured for contacting circumferential ends of springs 78c. Tabs 84a, 84b extend axially from a radially extending base 84c of flange 84, with tabs 84a extending axially rearward from radially extending base 84c into spaces circumferentially between springs 60c and tabs 84b extending axially forward from radially extending base 84c into spaces circumferentially between springs 78c. Base 84c is fixed to damper output 56 by a plurality of circumferentially spaced fasteners 86, which in this embodiment are rivets. A radially inner end 84d of damper flange 84 axially abuts a radially inner end 78g of spring retainer 78. Axially between tabs 84a, 84b damper flange 84 is further provided with a separating and retention tabs 84e between the two sets of springs 60c, 78c configured for separating springs 60c, 78c from each other and retaining springs 60c, 78c.

Damper output 56, which is configured to transfer torque from damper assembly 14 to transmission 15, includes a radially extending portion 56b fixed to base 84c of drive flange 84 by rivets 86 and an axially extending portion 56c provided with splines 56a on an inner diameter thereof and supporting bushing 58 on an outer diameter thereof.

Damper assembly 14 is thus configured for transferring torque from rotor carrier 28 along two parallel paths to drive flange 84, which then transfer the torque to transmission input shaft 15a via splines 56a. One of the paths is from rear damper cover 66 to rear damper hub 50, to rear spring retainer 60, to rear springs 60c and then to flange 84 via tabs 84a. The other path is from front damper cover 80 to front damper hub 72, to front spring retainer 78, to front springs 78c and then to flange 84 via tabs 84b.

Damper assembly 14 has a compact arrangement such that springs 60c, 78c, spring retainers 60, 78, hubs 50, 72, drive flange 84 and damper output 56 are all positioned radially inside of rotor carrier 28—i.e., these components of damper assembly 14 are closer to center axis CA than rotor carrier 28—with springs 78c, spring retainer 78, and hubs 50, 72 being directly radially inside of rotor carrier 28—i.e., these components of damper assembly 14 are closer to center axis CA than rotor carrier 28 and are radially aligned with rotor carrier 28—and with portions of springs 60c, spring retainer 60, flange 84 and hub 50 being directly radially inside of rotor carrier 28. Rear cover 66 and front cover 80 surround springs 60c, 78c.

Damper assembly 14 centers shaft 20 on front damper hub 72 via bushing 74, which is advantageous because clutch 18 in this embodiment in FIGS. 1 and 2 is longer than usual because clutch 18 functions as both a launch and disconnect clutch. The components of damper assembly 14 are arranged and configured to function together to provide centering of shaft 20, centering of damper assembly 14, packaging of damper assembly 16 inside rotor carrier hub 28b, while retaining the functionality of the pump hub from designs that include torque converters.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

LIST OF REFERENCE NUMERALS

CA center axis
10 hybrid module
13 internal combustion engine
14 damper assembly
16 electric motor
15 transmission
15a transmission input shaft
18 engine connect/disconnect clutch
20 shaft
22 stator
24 rotor
26 housing
28 rotor carrier
28a cylindrical axially extending section
28b annular radially extending section
30 clutch plates
32 splines
34 inner support
36 counter pressure plate
38 piston
40 spring
41 support plate
42 liftoff control plate
44 housing protrusion
46 ball bearing
48 rotor flange
50 rear damper hub
50a axially extending portion
50b radially extending portion
50c axial protrusion
50d blind holes
50e radially extending surface
51 pump hub
52 transmission front support
54 oil pump
56 damper output
56a damper spline
58 bushing
60 rear spring retainer
60a radially inner portion
60b rounded outer portion 60c first arc springs
60d rearmost spring edges
60e outermost spring circumferences
60f outer rim
62 fasteners
64 bushing
66 rear damper cover
68 fasteners
70 fasteners
72 front damper hub
72a rear axially extending protrusion
72b radially extending section
72c blind holes
72d radially extending surface
74 bushing
76 fasteners
78 front spring retainer
78a radially inner portion
78b rounded outer portion
78c second arc springs
78d frontmost spring edges
78e outermost spring circumferences
78f outer rim
78g radially inner end
80 front damper cover
82 fasteners
84 damper flange
84a rear damper tabs
84b front damper tabs
84c radially extending base
84d radially inner end
84e separating and retention tabs
86 fasteners

What is claimed is:

1. A hybrid module configured for arrangement in a torque path upstream from a transmission and downstream from an internal combustion engine, the hybrid module comprising:
    an electric motor including a rotor and a rotor carrier supporting the rotor;
    a clutch;
    a module input shaft configured for drivingly coupling to the internal combustion engine; and
    a damper assembly fixed to the rotor carrier, the clutch being configured for selectively coupling the damper assembly to the module input shaft, the damper assembly including a first set of springs, a damper output configured for connecting to an input shaft of the transmission, the damper assembly including a front damper hub brought together with an outer circumferential surface of the module input shaft to center the module input shaft, the damper assembly configured such that torque is transferred from the rotor carrier through the front damper hub to the first set of springs and then out of the damper output.

2. The hybrid module as recited in claim 1 wherein the the first set of springs is radially inside of the rotor carrier.

3. The hybrid module as recited in claim 2 wherein the damper assembly includes a first spring retainer retaining the first springs, the first spring retainer being fixed to the front damper hub.

4. The hybrid module as recited in claim 3 wherein the damper assembly includes a set of second springs axially spaced apart from the first springs, the damper assembly includes a second spring retainer retaining the second springs and a rear damper hub including a pump hub configured for driving an oil pump, the second spring retainer being fixed to the rear damper hub.

5. The hybrid module as recited in claim 1 wherein the damper assembly includes a rear damper hub including a pump hub configured for driving an oil pump.

6. The hybrid module as recited in claim 5 wherein the rear damper hub is configured for centering a front support of the transmission.

7. The hybrid module as recited in claim 1 wherein the rotor carrier includes an axially extending section and a radially extending section, the damper assembly being fixed to the radially extending section of the rotor carrier.

8. The hybrid module as recited in claim 7 wherein the damper assembly includes a rear damper cover and a front damper cover, the rear damper cover and the front damper cover being fixed to the radially extending section of the rotor carrier.

9. The hybrid module as recited in claim 8 wherein the rear damper cover and the front damper cover are fixed to the radially extending section of the rotor carrier by fasteners that pass through a radially outer end of the rear damper cover and a radially outer end of the front damper cover and into the radially extending section of the rotor carrier.

10. The hybrid module as recited in claim 8 wherein the damper assembly includes a first spring retainer retaining the first set of springs, the rear damper cover and the front damper cover surrounding the first set of springs.

11. The hybrid module as recited in claim 10 wherein the damper assembly includes a damper flange fixed to the damper output configured for being driven by the first set of springs of the first spring retainer.

12. The hybrid module as recited in claim 11 wherein the damper assembly includes a second spring retainer retaining a second set of springs, both of the first and second sets of springs configured for driving the damper flange.

13. A method of constructing a hybrid module configured for arrangement in a torque path upstream from a transmission and downstream from an internal combustion engine, the method comprising:
    providing an electric motor and a clutch, the electric motor including a rotor and a rotor carrier supporting the rotor;
    fixing a damper assembly to the rotor carrier such that the clutch is configured for selectively coupling the damper assembly to a module input shaft configured for drivingly coupling to the internal combustion engine, the damper assembly including a first set of springs, a damper output configured for connecting to an input shaft of the transmission and a front damper hub brought together with an outer circumferential surface of the module input shaft to center the module input shaft, the damper assembly configured such that torque is transferred from the rotor carrier through the front damper hub to the first set of springs and then out of the damper output.

14. The method as recited in claim 13 further comprising providing the damper assembly with a second set of springs and a rear damper hub including a pump hub configured for driving an oil pump, the damper assembly configured such that torque is transferred from the rotor carrier through the rear damper hub to the second set of springs and then out of the damper output.

15. The method as recited in claim 14 wherein the rear damper hub is configured for centering a front support of the transmission.

16. The method as recited in claim 13 wherein the rotor carrier includes an axially extending section and a radially extending section, the damper assembly including a rear damper cover and a front damper cover, the fixing of the damper assembly to the rotor carrier including fixing the rear damper cover and the front damper cover to the radially extending section of the rotor carrier.

17. The method as recited in claim 14 wherein the damper assembly includes at least one spring retainer retaining at least one of the set of first springs and the set of second springs, the damper assembly including a damper flange fixed to the damper output configured for being driven by the first set of springs and the second set of springs.

18. The method as recited in claim 17 wherein at least one spring retainer includes a first spring retainer retaining the first set of springs and a second spring retainer retaining the second set of springs, both of the first and second sets of springs configured for driving the damper flange, the damper assembly configured such that torque is transferred from the rotor carrier through the front damper cover to the first spring retainer and then to the first set of springs, the damper assembly configured such that torque is transferred from the rotor carrier through the rear damper cover to the second spring retainer and then to the second set of springs.

19. A hybrid module configured for arrangement in a torque path upstream from a transmission and downstream from an internal combustion engine, the hybrid module comprising:

an electric motor including a rotor and a rotor carrier supporting the rotor;
a clutch;
a module input shaft configured for drivingly coupling to the internal combustion engine; and
a damper assembly fixed to the rotor carrier, the clutch being configured for selectively coupling the damper assembly to the module input shaft, the damper assembly including a damper output configured for connecting to an input shaft of the transmission, the damper assembly including a set of first springs and a set of second springs axially spaced apart from the first springs, the damper assembly including a damper flange configured for being driven by the first and second springs to drive the damper output, the damper assembly being fixed to an axial end of the rotor carrier by a front damper cover and a rear damper cover, the front damper cover configured for transferring torque from the rotor carrier to the set of first springs, the rear damper cover configured for transferring torque from the rotor carrier to the set of second springs.

20. The hybrid module as recited in claim 19 wherein the damper flange is axially between the set of first springs and the set of second springs.

* * * * *